United States Patent
Chan et al.

(10) Patent No.: US 8,844,012 B1
(45) Date of Patent: Sep. 23, 2014

(54) CONNECTING TO WI-FI NETWORK BASED OFF APPROVAL FROM ANOTHER USER DEVICE

(71) Applicant: Nextbit Systems Inc., San Francisco, CA (US)

(72) Inventors: Michael A. Chan, San Francisco, CA (US); Justin Quan, San Francisco, CA (US); Daniel R. Bornstein, San Francisco, CA (US); Tom Moss, Los Altos, CA (US); Linda Tong, San Francisco, CA (US)

(73) Assignee: Nextbit Systems Inc., San Francisco, CA (US)

( * ) Notice: Subject to any disclaimer, the term of this patent is extended or adjusted under 35 U.S.C. 154(b) by 0 days.

(21) Appl. No.: 14/252,720

(22) Filed: Apr. 14, 2014

Related U.S. Application Data

(63) Continuation-in-part of application No. 14/221,189, filed on Mar. 20, 2014.

(60) Provisional application No. 61/804,134, filed on Mar. 21, 2013.

(51) Int. Cl.
*G06F 21/00* (2013.01)
*H04W 12/06* (2009.01)

(52) U.S. Cl.
CPC .................................... *H04W 12/06* (2013.01)
USPC ................................................ 726/7; 709/225

(58) Field of Classification Search
None
See application file for complete search history.

(56) References Cited

U.S. PATENT DOCUMENTS

| | | | | |
|---|---|---|---|---|
| 7,813,730 | B2 * | 10/2010 | Patel et al. | 455/433 |
| 8,438,631 | B1 * | 5/2013 | Taylor et al. | 726/15 |
| 2003/0200217 | A1 * | 10/2003 | Ackerman | 707/9 |
| 2009/0298467 | A1 * | 12/2009 | Zohar | 455/411 |
| 2011/0033052 | A1 * | 2/2011 | Yamada | 380/270 |
| 2011/0047603 | A1 * | 2/2011 | Gordon et al. | 726/5 |
| 2013/0090980 | A1 * | 4/2013 | Hummel | 705/7.29 |
| 2014/0033288 | A1 * | 1/2014 | Wynn et al. | 726/7 |
| 2014/0068058 | A1 * | 3/2014 | Wolf | 709/224 |

OTHER PUBLICATIONS

Co-Pending U.S. Appl. No. 14/221,189 by Chan, M.A., et al., filed Mar. 20, 2014.

* cited by examiner

*Primary Examiner* — Jason K. Gee
*Assistant Examiner* — Maung Lwin
(74) *Attorney, Agent, or Firm* — Perkins Coie LLP

(57) ABSTRACT

Technology is disclosed for sharing an authentication profile for accessing a Wi-Fi network between multiple devices. To access a particular Wi-Fi network on a first device and a second device, authentication information, e.g., a password for the Wi-Fi network, may have to be input on both the devices. In some embodiments, the technology facilitates obtaining an approval for accessing the Wi-Fi network on the second device from the first device. Upon receiving a request from a user of the second device to access the Wi-Fi network on the second device, the second device requests if any of the devices, e.g., devices in proximity, can approve the access request. A notification is displayed on the first device regarding the access request. The user associated with first device can then approve the access request, which causes authentication information for accessing the Wi-Fi network to be transmitted to the second device.

24 Claims, 11 Drawing Sheets

Authentication Profile

Computing Environment ID:

Username:

Password/Passcode:

Challenge Question 1:

Answer to Q1:

Challenge Question 2:

Answer to Q2:

...

CONNECTING TO WI-FI NETWORK BASED OFF APPROVAL FROM ANOTHER USER DEVICE

CROSS-REFERENCE TO RELATED APPLICATION(S)

This application is a continuation-in-part of U.S. patent application Ser. No. 14/221,189, entitled "SHARING AUTHENTICATION PROFILES BETWEEN A GROUP OF USER DEVICES", filed on Mar. 20, 2014, which claims the benefit of U.S. Provisional Patent Application No. 61/804,134, entitled "OPERATING SYSTEM AND DEVICE INTEGRATED WITH CLOUD COMPUTING FUNCTIONALITIES", filed on Mar. 21, 2013, all of which are incorporated by reference herein in their entirety.

TECHNICAL FIELD

Several of the disclosed embodiments relate to authentication of users, and more particularly, to sharing authentication profiles of the user between a group of user devices.

BACKGROUND

Portable devices such as mobile phones, smartphones, and tablet computers have become more common among individuals. The portable devices provide a convenient way to access various content, e.g., on Internet, via a wireless network. Typically, to access an access restricted computing environment, e.g., a server, an application executing on a server, or a communication network such as a wireless network, the user may have to input credential information, such as a username, a password, or answers to challenge questions, to gain access to the access restricted computing environment. For example, to gain access to a wireless network on a user device, a user may have to enter a password for authentication by the wireless network. If the user wants to access the same wireless network on another user device, the user may have to input the password again for authentication on the other user device. This can be burdensome for the user.

In another example, a banking website can have multiple authentication levels. For example, if the user is accessing the banking website for first time on a particular user device, in a first level of authentication, the banking website can require the user to provide a first set of credential information for the banking website to trust the user device. Then, upon successfully authentication of the first set of credential information, the banking website can require a second set of credential information, e.g., a username and password, to provide access to the user's bank account. If a user accesses the banking website from another user device, the user may have to input all the credential information again. While secure, inputting multiple sets of credential information every time a user requires access to an application can be burdensome for the user. Also, as the number of access restricted applications increase, the number of sets of credential information can increase, and remembering all the credential information can be an added burden.

BRIEF DESCRIPTION OF THE DRAWINGS

FIG. 2B is an example of an authentication profile that can be generated in the environment of FIG. 1.

DETAILED DESCRIPTION

Figure 1:
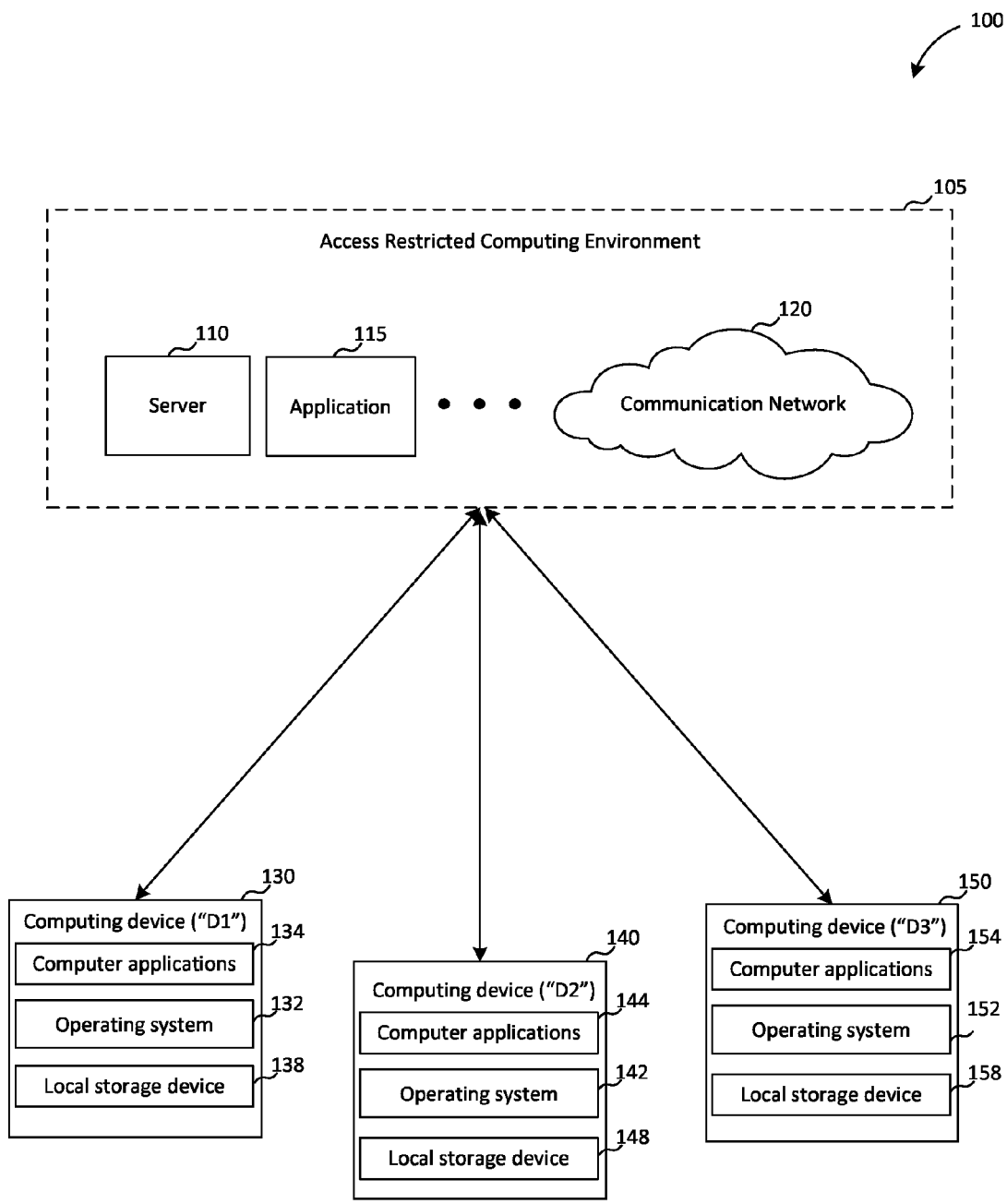
FIG. 1 is a block diagram illustrating an environment in which sharing of authentication profile between computing devices of a group for accessing an access restricted computing environment can be implemented.

Technology is disclosed for sharing an authentication profile of a user between user devices of a group for accessing an access restricted computing environment using any of the user devices ("the technology"). In some embodiments, the technology allows the user to obtain authentication information required to gain access to the access restricted computing environment from another user device, e.g., a user device from which the user has accessed the access restricted computing environment previously. In some embodiments, an access restricted computing environment can include a server, an application executing on the server, or a communication network such as a wireless network. The access restricted computing environment can require the user to input credential information (or authentication information), such as a username, a password, or answers to challenge questions, to authenticate the user. For example, to gain access to a wireless network on a first user device, a user may have to enter a password for authentication by the wireless network. If the user wants to access the same wireless network on a second user device, the user may have to input the password again on the second user device. The technology allows the user to obtain the authentication information required to gain access to the wireless network from another user device, e.g., a device such as the first device from which the user has accessed the wireless network previously. This eliminates the need for the user to input the authentication information again on the second user device.

In some embodiments, when the second user device requests the first user device to share the authentication profile with the second user device, the first user device determines if the second user device is also a member of the trusted devices group of which the first user device is a member. If the second user device is also a member of the trusted devices group of which the first user device is a member, the first user device transmits the authentication profile to the second user device. The second user device receives the authentication profile, extracts the authentication information from the authentication profile, and provides the authentication information to the wireless network to gain access. In some embodiments, the authentication profile can be transmitted in an encrypted form.

In some embodiments, the first user device shares the authentication profile with the second user device based on a location of the devices, e.g., if the devices are in proximity. The first user device can share the authentication profile if the first user device is in proximity to the second user device. In some embodiments, the user devices are considered to be in proximity if they can communicate with each other using short range wireless communications such as Bluetooth, Infrared, near field communications (NFC), AirDrop, Wi-Fi direct, Wi-Fi, Digital Living Network Alliance (DLNA), etc.

The authentication profile can contain authentication information such as a username, user identification (ID), a password, a passcode or answers to challenge questions. The authentication profile can also include ID of the access restricted computing environment, e.g., service set identification (SSID) of the wireless network. In some embodiments, the authentication profile is generated when the user accesses a wireless network for the first time. The user device on which the user accesses the wireless network for the first time can generate the authentication profile for the user for the wireless network upon successful authentication of the user on the user device. The user device can be a computing device, e.g., mobile computing devices such as a tablet, a laptop, or a smartphone, or a desktop.

An access restricted computing environment, e.g., a banking website, can have multiple authentication levels which require the user to provide one or more sets of authentication information. The authentication profile can be configured to store authentication information of one or more of the authentication levels. In some embodiments, the authentication profile is configured to store the authentication information required for all authentication levels. In some embodiments, the authentication profile is configured to store the authentication information required for one or more authentication levels. For example, for a banking website which includes multiple levels of authentication, e.g., one level of authentication for trusting or identifying a particular device of the user and another level of authentication for authenticating the user, the authentication profile can be configured to store credential information for identifying the user device. The user may then input the remaining credential information for gaining access to the bank account of the user. Conversely, the authentication profile can be configured to store the entire authentication information required to access the bank account.

Environment

FIG. 1 is a block diagram illustrating an environment in which sharing of authentication profile between computing devices of a group can be implemented. The environment 100 includes an access restricted computing environment 105 (also referred to as "computing environment 105") which can be accessed by users who are authenticated by the computing environment 105. The computing environment 105 can be one or more of a server 110 that provides a particular service, an application 115 that is executing on the server 110 or any other computer systems, or a communication network 120 such as a wireless network or Wi-Fi network. A user can access the computing environment 105 using one or more computing devices such as computing devices 130, 140 and 150. In some embodiments, the computing environment 105 requires the user to provide authentication information in order to provide access to the user for the computing environment 105. The user can gain access to the computing environment 105 upon successful authentication of the user by the computing environment 105. The user can provide the authentication information either manually, e.g., input using an input device, or obtain from a computing device that contains the authentication profile for the user for the computing environment 105. In some embodiments, the computing devices 130-150 can share the authentication profile between a set of computing devices.

The computing device 130-150 can be a desktop computer, a laptop computer, a tablet computer, an automobile computer, a game console, a smartphone, a personal digital assistant, home appliances, televisions, automobiles, drones, airplanes, autonomous devices such as robots, or other computing devices capable of running computer applications, as contemplated by a person having ordinary skill in the art. In some embodiments, the computing devices 130, 140 and 150 can communicate with each other via a communication network such as the communication network 120. The communication network 120 can be a local area network (LAN), a wireless LAN, wide area network (WAN) or the Internet. In some embodiments, the communication between the computing devices 130, 140 and 150 is routed through a server such as the server 110. For example, data related to computer applications 134 and 144 can be exchanged between the computing devices 130 and 140 through a server such as the server 110. In some embodiments, the computing devices 130, 140 and 150 can communicate with each other directly using a short range wireless communication, e.g. Bluetooth, Infrared, NFC, AirDrop, Wi-Fi direct, Wi-Fi, or DLNA.

The computing devices 130-150 include an operating system 132-152 to manage the hardware resources of the computing devices 130-150 and provide services for running computer applications 134-154 (e.g., mobile applications running on mobile devices). The operating system 132-152 facilitates execution of the computer applications 134-154 on the computing device 130-150. The computing devices 130-150 include at least one local storage device 138-158 to store the computer applications 134-154, operating system 132-152 and user data. Some examples of the operating system 132-152 include Android, iOS, Windows, and Macintosh.

The computer applications 134-154 stored in the computing devices 130-150 can include applications for general productivity and information retrieval, including email, calendar, contacts, stock market and weather information. The computer applications 134-154 can also include applications in other categories, such as mobile games, factory automation, GPS and location-based services, banking, order-tracking, ticket purchases or any other categories as contemplated by a person having ordinary skill in the art.

Although FIG. 1 illustrates three computing devices, a person having ordinary skill in the art will readily understand that the technology disclosed herein can be applied to a single computing device or more than two computing devices connected to the server 110. Note that the user associated with each of the computing devices 130-150 can be same or different users.

In some embodiments, when the user wants to access the computing environment 105 via a computing device, e.g., second computing device 140, the second computing device 140 determines whether any other computing devices contain the authentication profile for the computing environment 105. If the second computing device 140 determines that a first computing device 130 contains the authentication profile for the computing environment 105, the second computing device 140 requests the first computing device 130 to share the authentication profile with the second computing device 140. The second computing device can then use the authentication information from the obtained authentication profile to gain access to the computing environment 105. Additional details with respect to sharing the authentication profile between the computing devices 130-150 are described at least with reference to FIGS. 2-8.

Figure 2A:
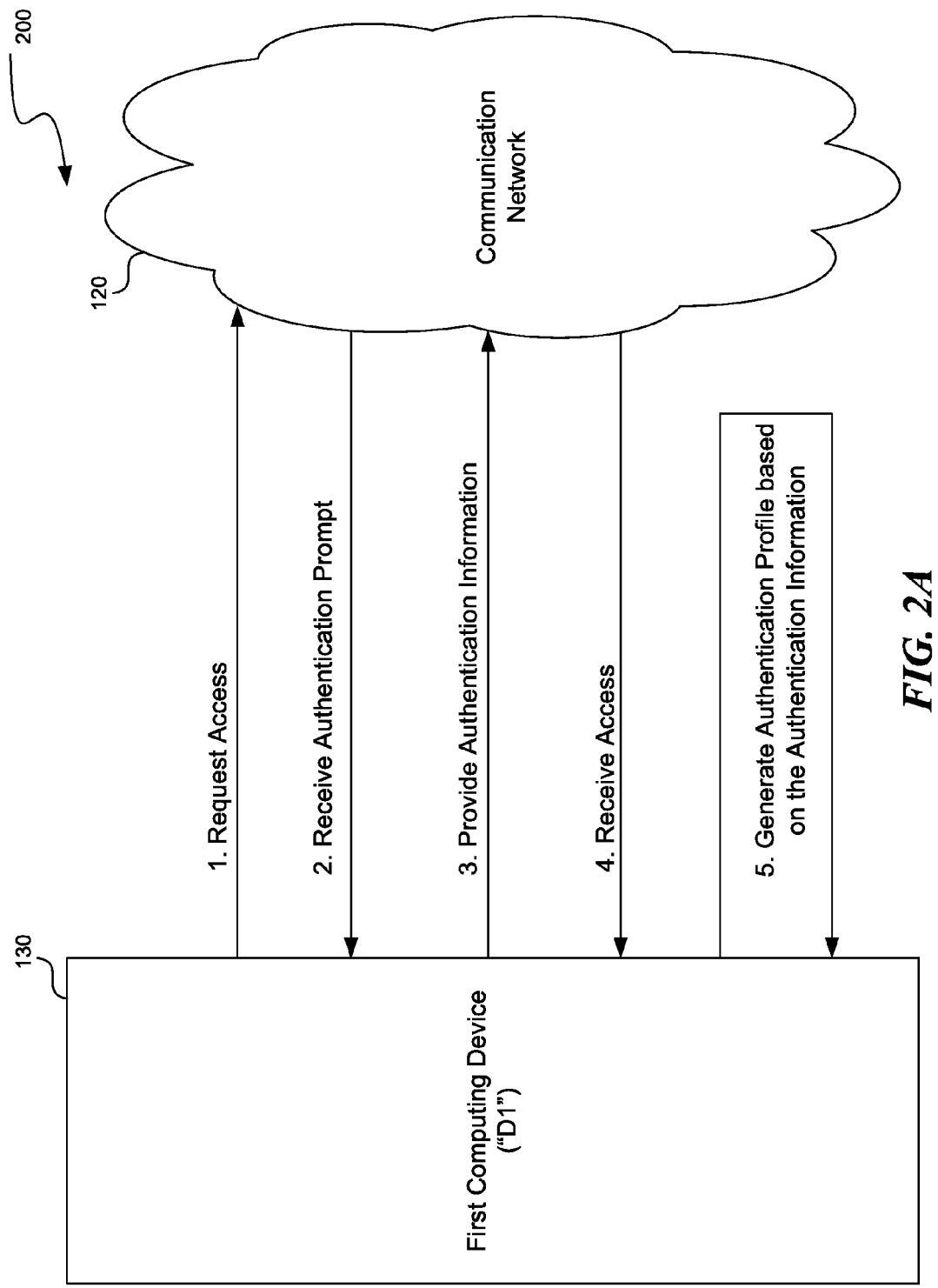
FIG. 2A is an example sequence diagram for generating an authentication profile.

FIG. 2A illustrates an example sequence diagram 200 for generating an authentication profile. In some embodiments, the generation of the authentication profile can be implemented in the environment 100 of FIG. 1. Note that the following paragraphs describe the sharing of authentication profile with reference to communication network 120. However, the sharing of authentication profile is not restricted to communication network 120. The technology can be implemented in various other access restricted computing environments 105 that can require the user to provide authentication information to gain access to the access restricted computing environment 105, as contemplated by a person having ordinary skill in the art.

At step 1, the user requests access to the communication network 120 using the first computing device 130. In some embodiments, the communication network 120 can be a password protected wireless network. Consider that the user has not accessed the communication network 120 prior to the current request on any of the computing devices 130-150. In response to the access request, at step 2, the first computing device 130 receives an authentication prompt from the communication network 120 requesting the user to provide authentication information, e.g., a password for the wireless network.

At step 3, the user provides the authentication information to the communication network 120, e.g., manually inputs the password, in response to the authentication prompt. The communication network 120 verifies the authentication information provided by the user. If the authentication fails, the user can be denied access to the communication network 120. If the authentication succeeds, at step 4, the user obtains access to the communication network 120 on the first computing device 130.

At step 5, the first computing device 130 generates an authentication profile for the communication network 120. The authentication profile can contain authentication information such as a password to the communication network 120. The authentication profile can also include ID of the communication network 120, e.g., SSID of the wireless network. In some embodiments, if the user has accessed multiple communication networks, e.g., multiple wireless networks, then an authentication profile can be created for each of the communication networks accessed by the first computing device 130.

Similarly, various authentication profiles can be created for other types of access restricted computing environment 105 accessed by the user using the first computing device 130. For example, an authentication profile for a banking website can include answers to challenge questions, e.g., authentication information for identifying a particular computing device of the user by the banking website, and username and password, e.g., to authenticate the user to provide access to the bank account information.

FIG. 2B is an example of an authentication profile 250 that can be generated in the environment 100. The authentication profile 250 can include a computing environment ID, e.g., SSID of the wireless network. The authentication profile 250 can also include different authentication information such as username or user identification (ID), a password or passcode, challenge questions or answers to challenge questions. In some embodiments, the user may choose the type of authentication information that can be stored in the authentication profile 250. That is, the user may choose to store or not store particular authentication information in the authentication profile 250. For example, for the banking website, the user may choose to store answers to challenge questions, but choose not to store username and password. In the example of communication network 120, the user can choose to store only password of the wireless network. In some embodiments, the computing environment ID may be a mandatory field in the authentication profile 250. In some embodiments, the first computing device 130 can encrypt the authentication profile 250, e.g., for security purposes. Various known encryption techniques can be used to encrypt the authentication profile 250.

Figure 3:
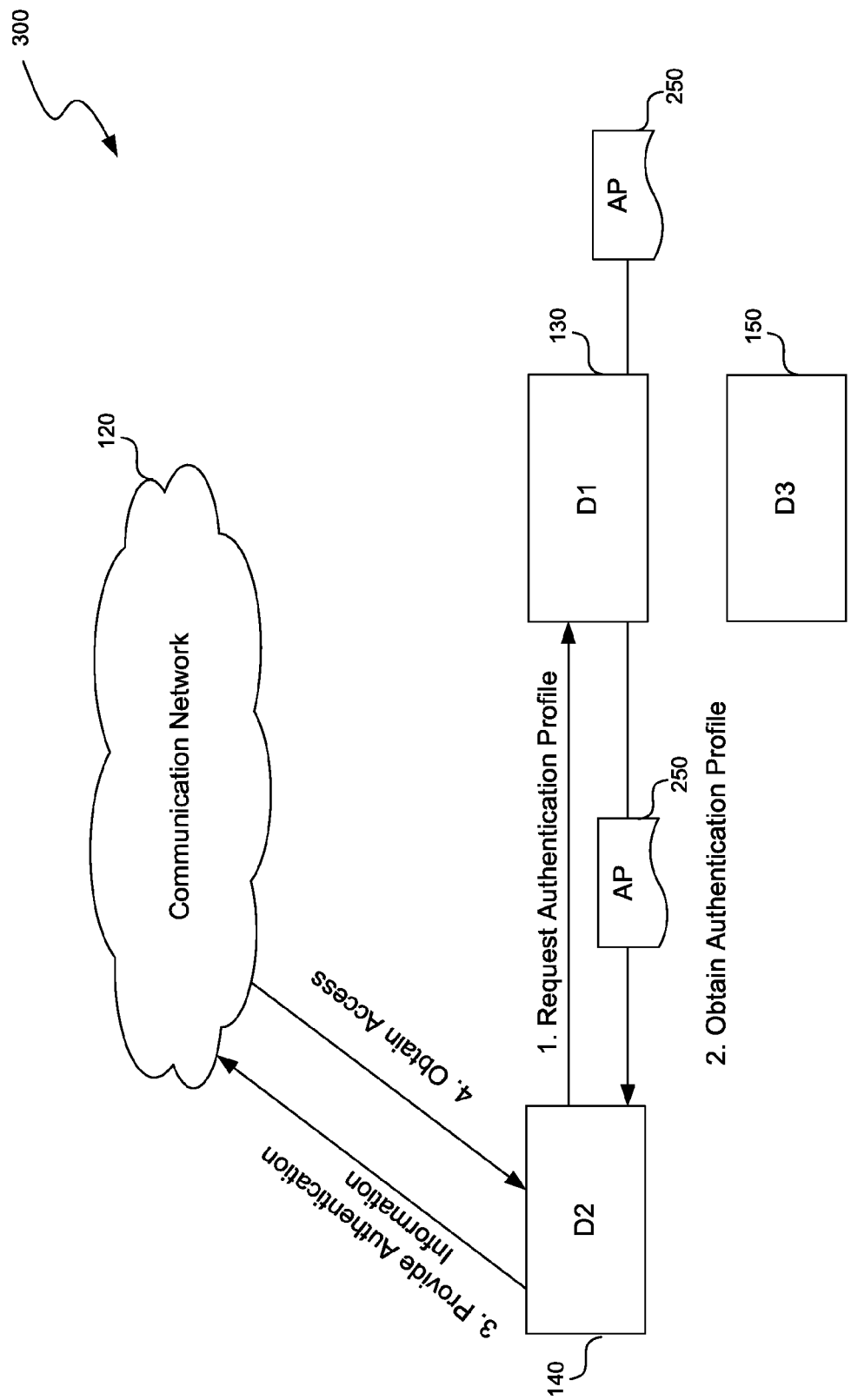
FIG. 3 is an example illustrating sharing of the authentication profile between a group of computing devices.

FIG. 3 is an example 300 illustrating sharing of the authentication profile between a group of computing devices. In some embodiments, the example 300 may be implemented in the environment 100. The user intends to access the communication network 120 using the second computing device 140. The communication network 120 requests the user to provide authentication information, e.g., password. The user can provide the authentication information manually, e.g., type in the password, or obtain the password from another computing device, e.g., a computing device that has accessed the communication network 120 previously or contains the authentication profile 250 for the communication network 120. The second computing device 140 determines if any of the other computing devices can approve the access request for the communication network 120. In some embodiments to determine if any of the other computing devices can approve the access request, the second computing device 140 determines if any of the other computing devices, e.g., computing devices 130 and 150, contain the authentication profile 250. The second computing device 140 determines that the first computing device contains the authentication profile 250 for the communication network 120.

The second computing device 140 requests the first computing device 130 to share the authentication profile 250 with the second computing device 140. The first computing device 130 then transmits the authentication profile 250 to the second computing device 140. In some embodiments, the first computing device 130 can encrypt the authentication profile 250 and then transmit the encrypted authentication profile 250. The second computing device 140 obtains the authentication profile 250, decrypts the authentication profile 250 if encrypted, and extracts the authentication information, e.g., password to the wireless network, from the authentication profile 250. The second computing device 140 then provides the authentication information to the communication network 120 and obtains access to the communication network 120 upon successful authentication. In some embodiments, by obtaining the authentication profile 250 from the first computing device 130, the need for a manual user input of the password to the wireless network is eliminated.

Figure 4:
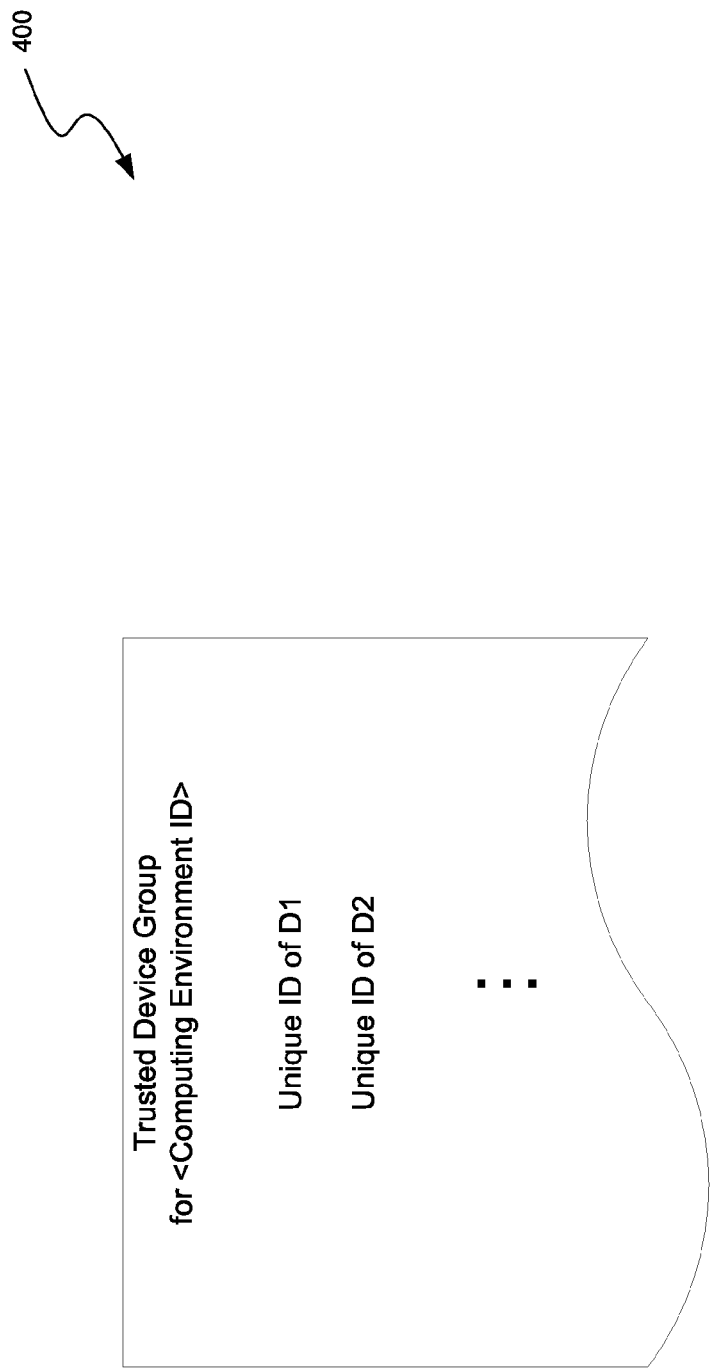
FIG. 4 is an example of a trusted devices group table containing a set of computing devices of a trusted devices group for a particular computing environment.

In some embodiments, the first computing device 130 approves the access request of the second computing device 140, e.g., shares the authentication profile 250 with the second computing device 140, if the second computing device 140 is a member of the trusted devices group of which the first computing device 130 is a member. A trusted devices group is a set of computing devices between which an authentication profile for a particular computing environment can be shared. FIG. 4 is an example of a trusted devices group table 400 containing the set of computing devices of a trusted devices group for a particular computing environment. Each of the computing devices 130-150 is associated with a unique ID. The unique ID can include a user ID or username associated with the user, a device ID of the corresponding computing device, a random string uniquely identifying the computing devices, a user defined ID, or a combination thereof. The trusted devices group table 400 contains unique IDs of the computing devices that are part of the trusted devices group and a computing environment ID of the particular computing environment. In some embodiments, the device IDs can be user defined device IDs, media access control (MAC) address of the computing devices 130-150, or other IDs that can identify the computing devices 130-150 uniquely. Each of the computing devices 130-150 can have a copy of the trusted devices group table 400, have access to a location where the trusted devices group table 400 is stored, or have a means to determine whether or not the computing devices are members of a particular trusted devices group.

In some embodiments, the computing devices 130-150 can provide a graphical user interface (GUI) to manage the trusted devices group. The user can customize the trusted devices group, e.g., add or remove computing devices from a group, add or remove a trusted device group, using the GUI. The trusted devices group table 400 is one implementation of the trusted devices group. However, the trusted devices group can be implemented using various data structures. For example, the trusted devices group can be implemented as a software object. In another example, the trusted devices group can be implemented as a file.

Further, in some embodiments, the first computing device 130 shares the authentication profile 250 with the second computing device 140 based on the location of the first computing device 130. For example, if the communication network 120 is a wireless network, the first computing device 130 can share the authentication profile 250 with the second computing device 140 if the first computing device 130 is also connected to the wireless network. In another example, the first computing device 130 can share the authentication profile 250 if the first computing device 130 is in proximity to the second computing device 140, e.g., to facilitate the computing devices 130 and 140 communicate with each other using various short range wireless communication. A short range wireless communication can include Wi-Fi communication via a wireless access point and peer-to-peer (P2P) communication techniques, e.g., Bluetooth, Wi-Fi direct, AirDrop, Infrared, DLNA, or NFC.

In some embodiments, the access request of the second computing device 140 may not be approved by the first computing device 130, e.g., if the second computing device 140 and the first computing device 130 are not members of the same trusted devices group or if they are not in proximity. In some embodiments, even if the first computing device 130 does not approve the access request, the user of the first computing device 130 (e.g., can be the same user as that of the second computing device 140 or a different user) can manually approve the access request. For example, when the access request is rejected by the first computing device 130, a notification may be displayed on the first computing device 130 asking whether the user wants to approve the access request from the second computing device 140. The user may select to approve or disapprove the access request using the notification. In some embodiments, the notification also indicate the reason for rejection of the access request by the first computing device 130.

Further, in some embodiments, the access requests may be approved only by the user associated with the first computing device, i.e., the first computing device 130 may not approve the access requests without user intervention. The first computing device 130 can be configured to notify the user whenever an access request is received at the first computing device 130. The user may then select to approve or disapprove the access request manually. In some embodiments, the user may approve or disapprove the access requests regardless of whether or not the computing device requesting the access and the computing device using which the user approves the request are members of a common trusted devices group.

The computing devices 130-150 communicate with each other using the above described short range wireless communication or via a server. For example, the second computing device 140 can request the other computing devices, e.g., computing devices 130 and 150, for the authentication profile 250 using the short range wireless communication. Similarly, the first computing device 130 can respond and/or transmit the authentication profile 250 to the second computing device 140 using a short range wireless communication. In another example, the computing devices 130-150 can share the authentication profile 250 via the server.

Figure 5:
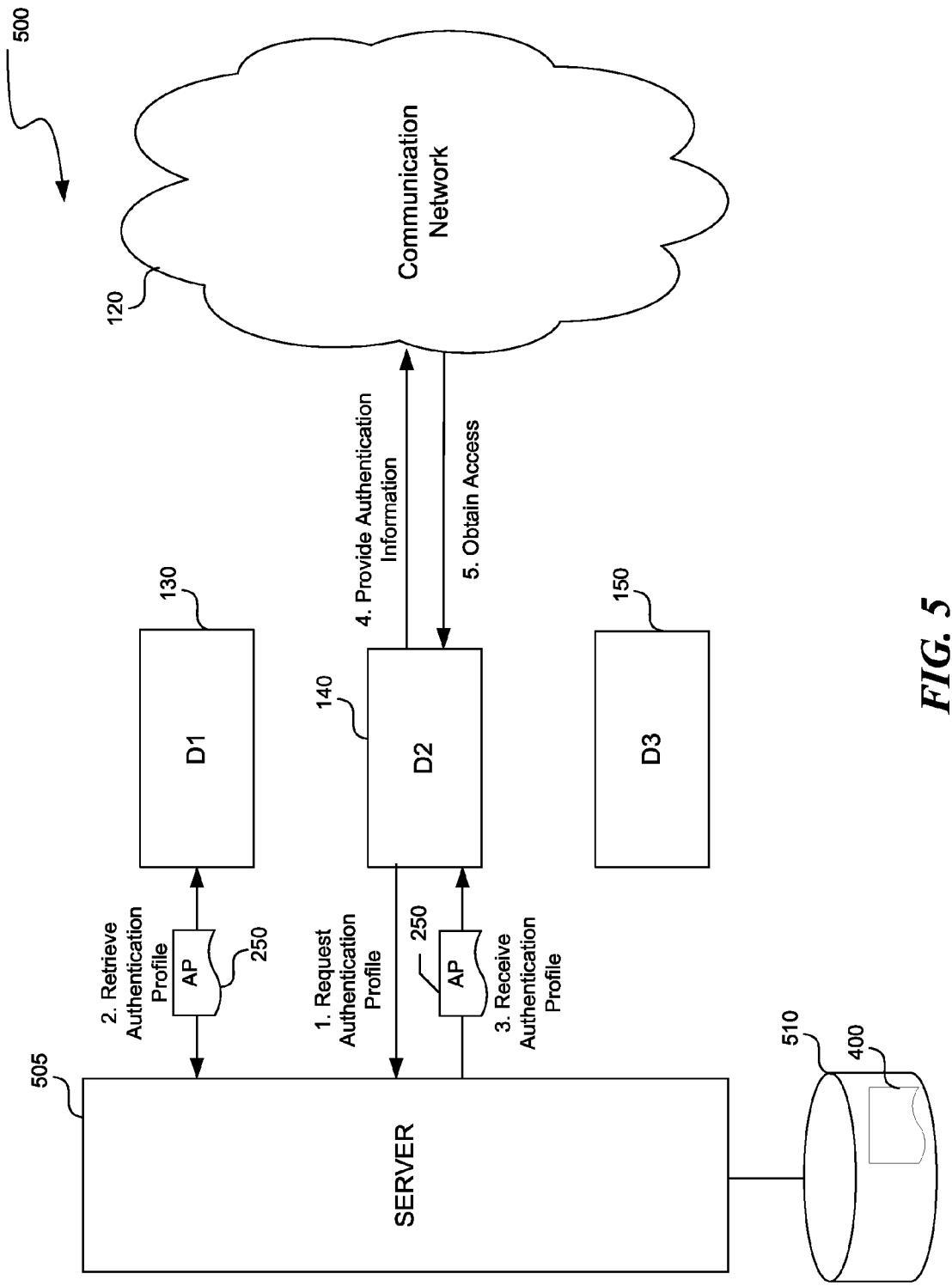
FIG. 5 is a block diagram illustrating a system for sharing the authentication profile between computing devices of a group via a server.

FIG. 5 is a block diagram illustrating a system 500 for sharing authentication profile between computing devices of a group via a server. In some embodiments, the system 500 can be implemented in the environment 100. The user intends to access the communication network 120 using the second computing device 140. The communication network 120 requests the user to provide authentication information, e.g., password. The user can provide the authentication information manually, e.g., type in the password, or obtain the password from another computing device, e.g., a computing device that has accessed the communication network 120 previously or a computing device that contains the authentication profile 250. The second computing device 140 requests a server 505 to obtain the authentication information for accessing the communication network 120. In some embodiments, the second computing device 140 communicates server 505 via a network (different from communication network 120) such as LAN, wireless LAN or Internet. It is assumed that the computing devices 130-150 have access to the server 505.

The server 505 determines if any of the other computing devices, e.g., computing devices 130 and 150 contain the authentication information. The server 505 can find the computing devices having the authentication profile in various ways. For example, the server 505 can send a request to each of the computing devices to determine if the computing devices contain the authentication information for the communication network 120. In another example, the server 505 can maintain, for each of the computing devices, a list of computing environments 105 a particular computing device has the authentication profile 250 for. The server 505 can determine from the list whether a particular computing device has an authentication profile for a particular computing environment. The computing devices 130-150 can report to the server 505 whenever they access a new computing environment and the server 505 can update the list accordingly. The server 505 can maintain the list at a data store 510. In some embodiments, the server 505 can also store the authentication profiles generated by the computing devices at the data store 510. In some embodiments, a user such as an administrator of the server 505 or the user of computing devices 130-150 can decide whether to store the authentication profiles, e.g., authentication profile 250, in the data store 510.

Referring back to the determination by the server 505, the server 505 determines that the first computing device 130 contains the authentication profile 250 for the communication network 120. The server 505 determines whether the first computing device 130 and the second computing device 140 are members of the same trusted devices group for the communication network 120. In some embodiments, the server 505 stores the information regarding the trusted devices groups, e.g., trusted devices group table 400, in the data store

510. If the server 505 determines that the first computing device 130 and the second computing device 140 are members of the same trusted devices group, the server 505 obtains the authentication profile 250 from the first computing device 130. Alternatively, the server 505 can obtain the authentication profile 250 from the data store 510, if the server 505 is configured to store the authentication profile 250 at the data store 510.

The server 505 transmits the authentication profile 250 to the second computing device 140. In some embodiments, the server 505 can encrypt the authentication profile 250 and then transmit the encrypted authentication profile 250. The second computing device 140 receives the authentication profile 250 from the server 505, decrypts the authentication profile 250 if encrypted, and extracts the authentication information, e.g., password to the wireless network, from the authentication profile 250. The second computing device 140 then provides the authentication information to the communication network 120 and obtains access to the communication network 120 upon successful authentication.

Figure 6:
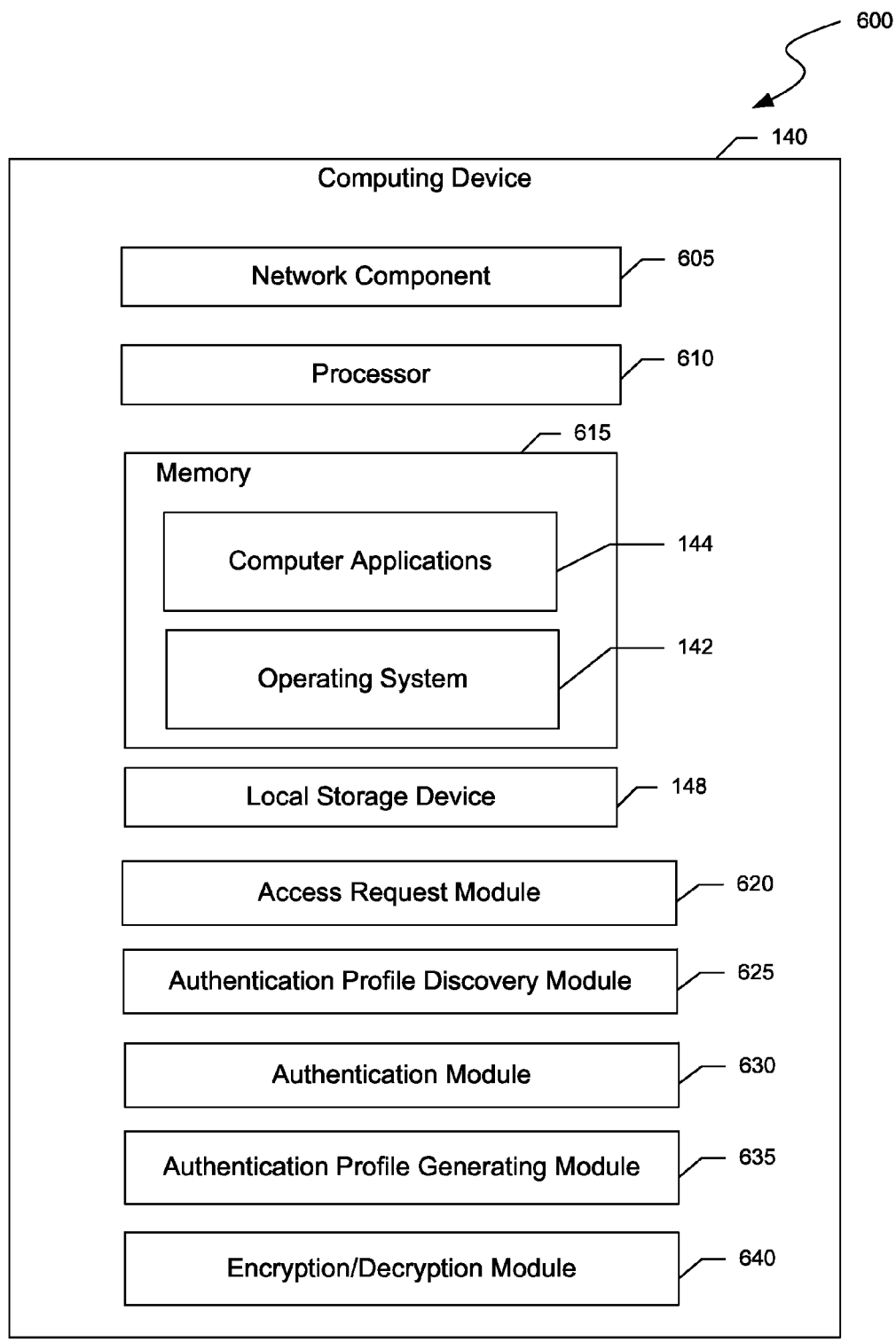
FIG. 6 is a block diagram of the computing device that can be used for accessing the access restricted computing environment and sharing the authentication profiles.

FIG. 6 illustrates a block diagram 600 of a computing device that can be used for accessing the access restricted computing environment 105 and sharing the authentication profiles. The computing device 140 can include a network component 605, a processor 610, a memory 615, the local storage device 148, an access request module 620, an authentication profile discovery module 625, an authentication module 630, an authentication profile generating module 635, and an encryption/decryption module 640. The memory 615 can store instructions of the operating system 142 of the computing device 140. The memory 615 can further store instructions of the computer applications 144 designed to run at the computing device 140.

The network component 605 can be capable of switching between states including a high power consumption state and a low power conservation state. The network component 605 can be, e.g. a Wi-Fi networking adapter, a cellular phone networking adapter, etc. The network component 605 is configured for network communications with other devices, including the server 505 and other computing devices, e.g., the computing devices 140 and 150, e.g., for sharing authentication profiles. The processor 610 is configured to execute the computer applications 144 and the operating system 142 of the computing device 140. The memory 615 stores instructions of the operating system 142 which, when executed by the processor 610, cause the operating system 142 to perform processes for realizing certain functionalities of the computing device 140. For instance, the process of the operating system 142 can facilitate the other modules of the computing device 140 to communicate with the server 505 and other computing devices 130 and 150 to share the authentication profile 250.

The local storage device 148, as described above, can store the instructions, the operating system 142, user data such as profile data of the user, data files of the user and any other data necessary for the operation of the computing device 140 and execution of the computer applications 144.

The access request module 620 requests a computing environment 105, e.g., communication network 120 access to the computing environment 105. The authentication profile discovery module 625 determines whether any of the computing devices, e.g., the first computing device 130 or the third computing device 150, has the authentication profile 250. The authentication profile discovery module 625 determines that the first computing device 130 has the authentication profile 250 of the user for the communication network 120 and obtains the authentication profile 250 from the first computing device 130. In some embodiments, the authentication profile discovery module 625 determines whether any of the computing devices has the authentication profile 250 by either requesting the other computing devices directly, e.g., using above described short range wireless communication, or requesting a server, e.g., server 505. Similarly, the other computing devices, e.g., the first computing device 130, can respond to the request and/or transmit the authentication profile 250 to the second computing device 140 directly or via the server 505.

In some embodiments, the first computing device 130 shares the authentication profile 250 with the second computing device 140 if the second computing device 140 is a member of the trusted devices group of which the first computing device 130 is a member. The first computing device 130 determines, e.g., using an authentication profile discovery module such as the authentication profile discovery module 625, whether the first computing device 130 and the second computing device 140 are members of the same trusted devices group for the communication network 120.

In some embodiments, the first computing device 130 can encrypt the authentication profile 250, e.g., using an encryption module such as the encryption/decryption module 640, and then transmit it to the second computing device 140. After receiving the encrypted authentication profile 250 from the first computing device 130, the encryption/decryption module 640 decrypts the encrypted authentication profile 250. The authentication module 630 extracts the authentication information, e.g., password to the communication network 120, from the authentication profile 250, and provides the authentication information to the communication network 120. Upon successful authentication of the password, the second computing device 140 obtains access to the communication network 120. The second computing device 140 may then communicate with other computer systems over the communication network 120, e.g., via the network component 605.

The authentication profile generating module 635 generates an authentication profile such as the authentication profile 250, e.g., when the user of the second computing device 140 accesses a computing environment 105 and no other computing device of the user has the authentication profile 250 for the computing environment 105.

The authentication module 630 can also be configured to present notifications to the user, e.g., on a display of the second computing device 140, to indicate the rejection of access requests received at the second computing device 140 from other computing devices and/or to allow the user to manually approve or disapprove the access requests.

Note that in some embodiments, the computing devices 140 and 150 also include components/modules described above with reference to computing device 130.

Figure 7:
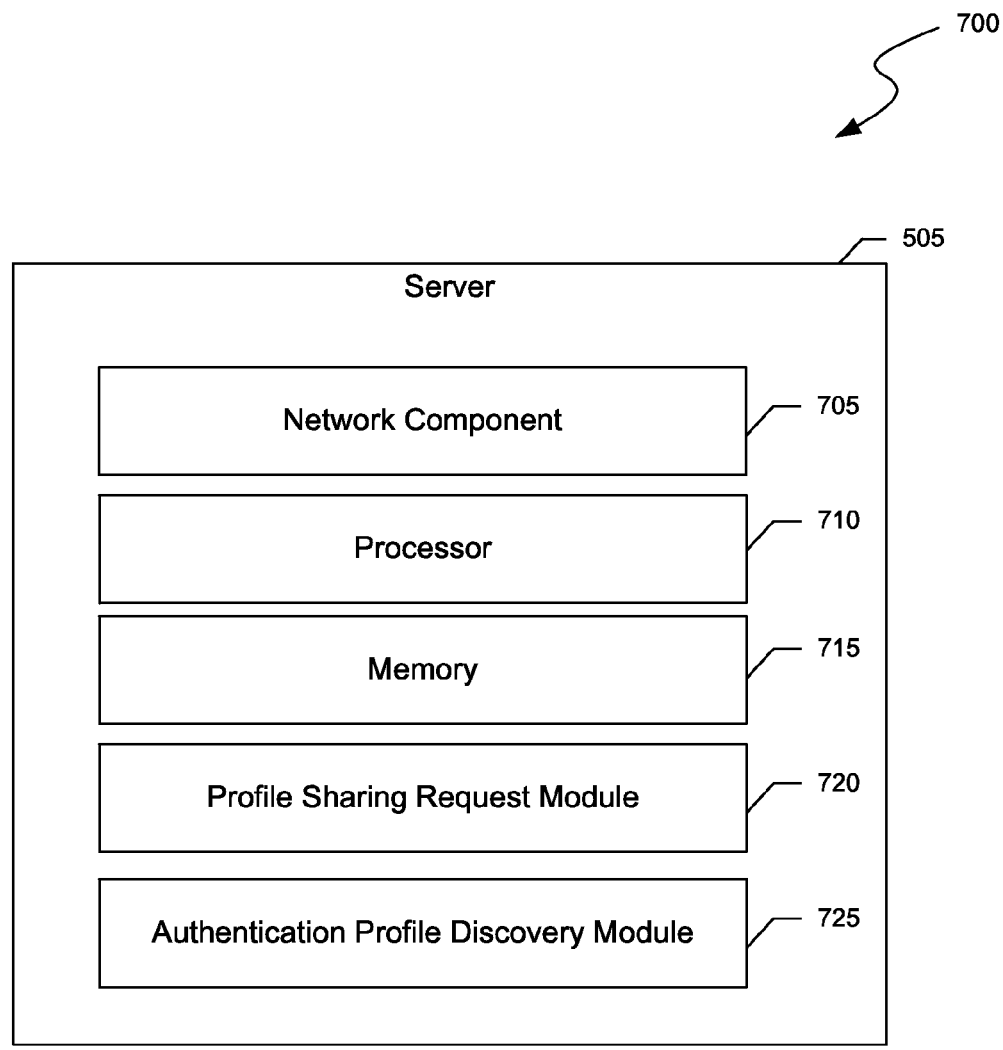
FIG. 7 is a block diagram of a server for facilitating sharing of authentication profiles between computing devices of a group.

FIG. 7 is a block diagram of a server for facilitating sharing of authentication profiles between computing devices of a group. The server 505 can be, e.g., a dedicated standalone server, or implemented in a cloud computing service having a plurality of servers. The server 505 includes a network component 705, a processor 710, a memory 715, a profile sharing request module 720 and an authentication profile discovery module 725. The memory 715 can include instructions which when executed by the processor 710 enables the server 110 to perform the functions, including sharing authentication profile between the computing devices 130 and 140, as described with reference to FIG. 5. The network component 705 is configured for network communications with other devices, including the computing devices 130, 140 and 150, e.g., for sharing authentication profile 250 between the computing devices 130 and 140.

The profile sharing request module 720 receives a request from a computing device of a user, e.g., a second computing device 140 to provide the authentication profile for accessing an access restricted computing environment 105, e.g., communication network 120. The authentication profile discovery module 725 to determines if any of the computing devices, e.g., computing devices 130 and 150, contain the authentication profile 250 250 for accessing the communication network 120. In some embodiments, a particular computing device on which the user has been authenticated by the communication network 120 previously can have the authentication profile 250.

The authentication profile discovery module 725 can find the computing devices having the authentication profile in various ways. For example, the authentication profile discovery module 725 can send a request to each of the computing devices, e.g., computing device 130 and 150, to determine if the computing devices contain the authentication information for the communication network 120. In another example, the server 505 can maintain, for each of the computing devices, a list of computing environments 105 a particular computing device has the authentication profile for. The authentication profile discovery module 725 can determine from the list whether a particular computing device has an authentication profile for a particular computing environment.

After the authentication profile discovery module 725 determines that a computing device, e.g., the first computing device 130 contains the authentication profile 250 for the communication network 120, the authentication profile discovery module 725 can obtain the authentication profile 250 from the first computing device 130. In some embodiments, the authentication profile discovery module 725 obtains the authentication profile 250 from the first computing device 130 if the first computing device 130 and the second computing device 140 are members of the same trusted devices group for the communication network 120. In some embodiments, the authentication profile discovery module 725 can refer to the trusted devices group table 400 to determine whether the first computing device 130 and the second computing device 140 are members of the same trusted devices group for the communication network 120.

After obtaining the authentication profile 250 from the first computing device 130, the network component 705 transmits the authentication profile 250 to the second computing device 140. In some embodiments, the authentication profile discovery module 725 receives the authentication profile 250 from the first computing device 130 in an encrypted format and transmits the authentication profile 250 to the second computing device 140 in an encrypted format. In some embodiments, the authentication profile discovery module 725 communicates with the other components, e.g., computing devices 130-150 and data store 510 over one or more communication networks (different from communication network 120) such as LAN, WAN, or Internet.

Figure 8:
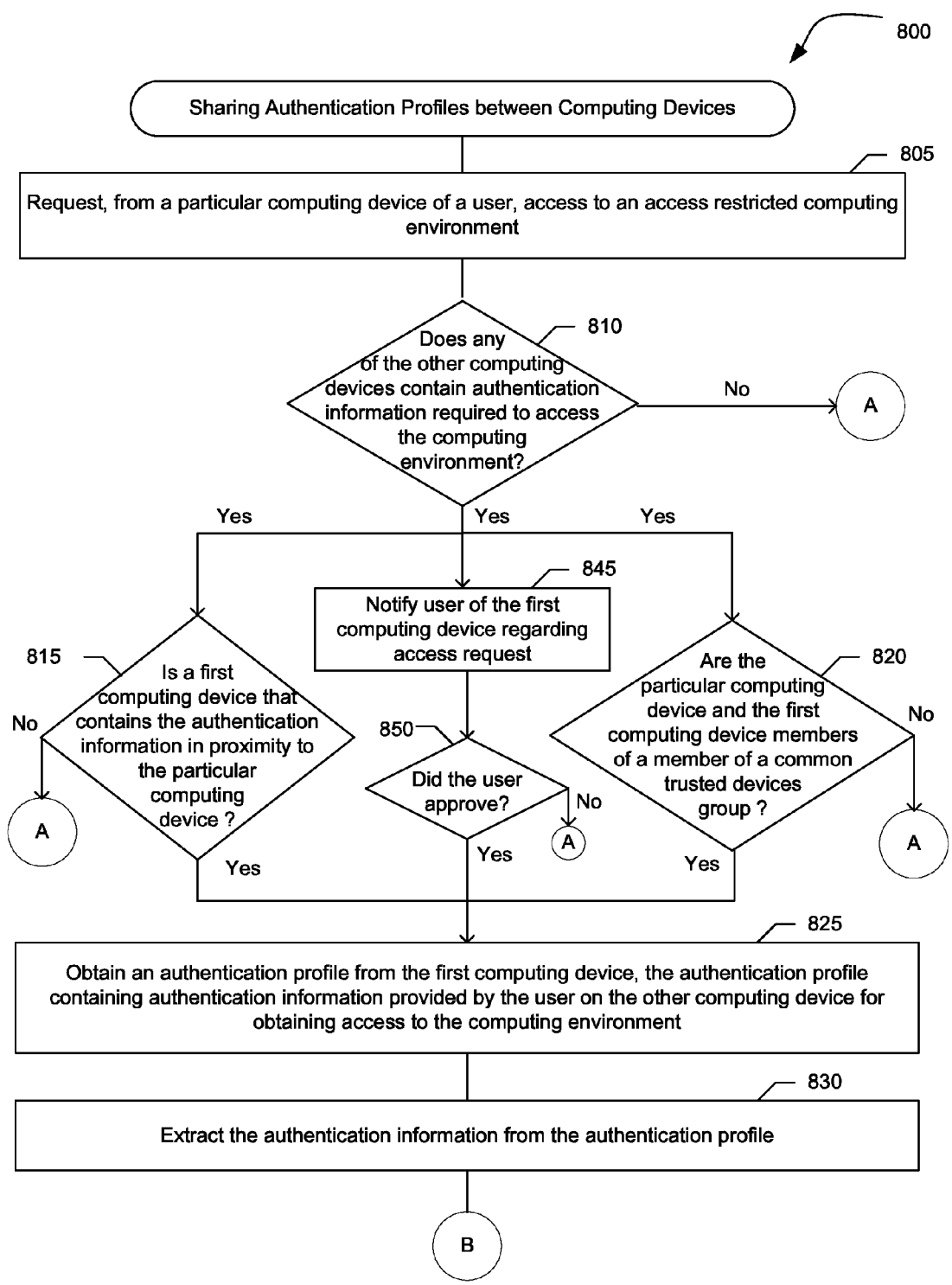
FIG. 8 is a flow diagram a process of sharing authentication profiles between computing devices of a group for access a particular access restricted computing environment.
Figure 8:
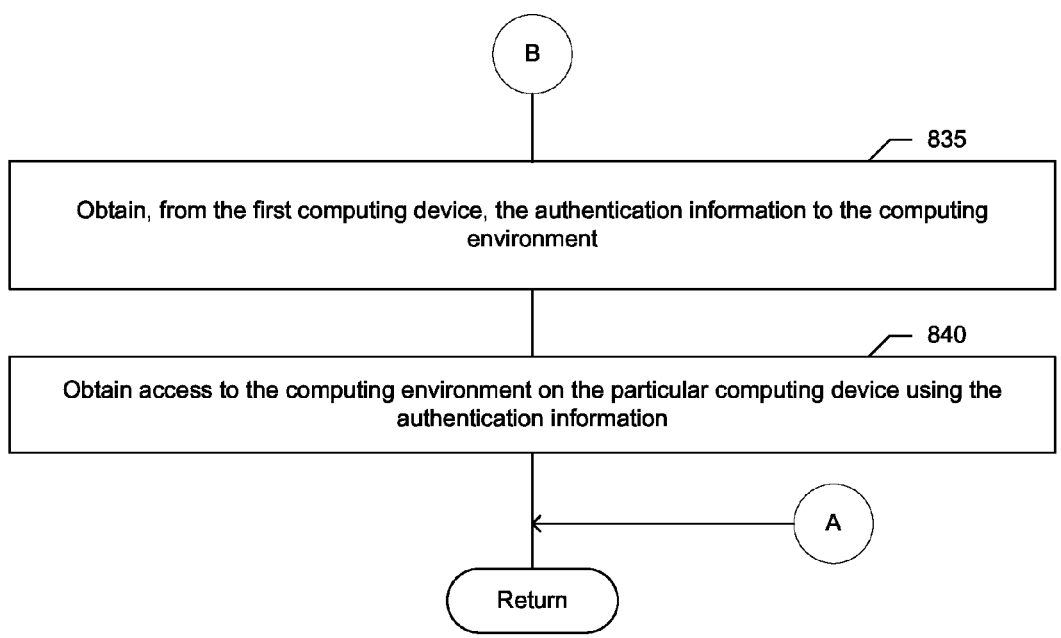

FIG. 8 is a flow diagram a process 800 of sharing authentication profiles between computing devices of a group for access a particular access restricted computing environment. In some embodiments, the process 800 may be implemented in the environment 100 of FIG. 1, and may be executed using a computing device such as computing device 140. At block 805, the access request module 620 requests access to an access restricted computing environment, e.g., communication network 120.

At decision block 810, the authentication profile discovery module 625 determines whether any of the other computing devices, e.g., computing devices 130 and 150, can approve the access request, i.e., contain the authentication information to access the computing environment 105. Responsive to a determination that none of the other computing devices contain the authentication profile for accessing the computing environment 105, the process 800 returns. Alternatively, the user of the first computing device 130 can manually approve the access request.

After the determination that one of the computing devices of the user, e.g., a first computing device 130, contains the authentication profile, the process 800 can proceed in multiple possible paths, e.g., a first path—block 810 to 845, a second path—810 to 815, or a third path 810 to 820.

In the first path, the process 800 proceeds from block 810 to block 845. At block 845, an authentication module of the first computing device 130 displays a notification regarding the access request to the user. At decision block 850, the user may approve or disapprove the access request using the notification. If the user selects to disapprove the access request, the process 800 returns. On the other hand, if the user selects to approve the access request, the process 800 proceeds to block 825 to obtain the authentication profile from the first computing device 130.

In the second path, the process 800 can proceed from block 810 to decision block 815 to determine if the second computing device 140 and the first computing device 130 are in proximity. The first computing device 130 can share the authentication profile 250 if the first computing device 130 is in proximity to the second computing device 140. In some embodiments, the computing devices are considered to be in proximity if they can communicate with each other using above described short range wireless communication. The first computing device 130 shares the authentication profile 250 with the second computing device 140 based on the location of the first computing device 130. In some embodiments, the first computing device 130 is considered to be in proximity with the second computing device 140 if the first computing device 130 is also connected to the communication network 120. If the first computing device 130 is in proximity to the second computing device 140, the process 800 process proceeds to block 825, else the process 800 returns.

In the third path, the process 800 proceeds from block 810 to decision block 820. At decision block 820, the authentication profile discovery module 625 determines if the first computing device 130 and the second computing device 140 are members of the same trusted devices group for the computing environment 105. Responsive to a determination that the first computing device 130 and the second computing device 140 are members of the same trusted devices group for the communication network 120, the process 800 process proceeds to block 825, else the process 800 returns.

At block 825, the authentication profile discovery module 625 obtains the authentication profile for the computing environment 105 from the first computing device 130. At block 830, the authentication module 630 extracts the authentication information from the authentication profile, and at block 835, the authentication module 630 provides the authentication information to the computing environment 105. Upon successful authentication by the computing environment 105, at block 840, the second computing device 140 obtains access to the computing environment 105, and the process 800 returns.

Note that the path taken by the process 800 from the decision block 810 to block 825 can be customized by the user. In some embodiments, the user can also configure additional paths, e.g., the process 800 can perform both the checks 815 and 820, and obtain the authentication profile 250 if both the checks are satisfied (e.g., they result in a "yes").

The computing devices 130-150 can communicate with one another, e.g., to perform the steps of 810-825, directly or via a server. For example, the computing devices 130-150 can communicate with one another directly using short range wireless communication as described at least with reference to FIG. 3. In another example, the computing devices 130-150 can communicate with one another via a server as described at least with reference to FIG. 5.

Figure 9:
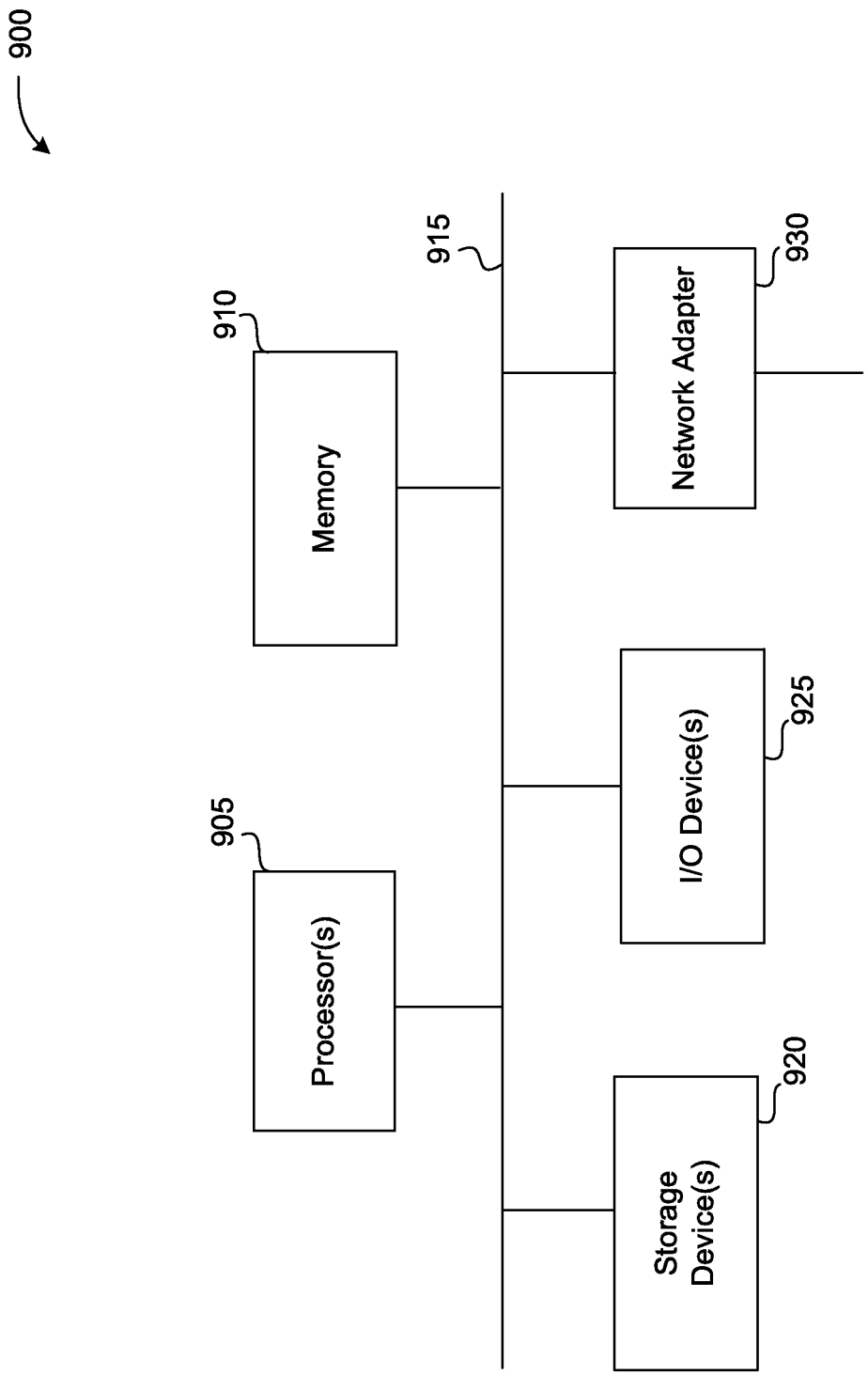
FIG. 9 is a block diagram of a computer system as may be used to implement features of some embodiments of the disclosed technology.

FIG. 9 is a block diagram of a computer system as may be used to implement features of some embodiments of the disclosed technology. The computing system 900 may be used to implement any of the entities, components or services depicted in the examples of FIGS. 1-8 (and any other components described in this specification). The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 910 can be implemented as software and/or firmware to program the processor(s) 905 to carry out actions described above. In some embodiments, such software or firmware may be initially provided to the computing system 900 by downloading it from a remote system through the computing system 900 (e.g., via network adapter 930).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method for sharing an authentication profile between a plurality of computing devices for accessing a particular Wi-Fi network, the method comprising:

obtaining, at a first computing device of the computing devices, a list of Wi-Fi networks that are in a range of the first computing device, the computing devices associated with a user;

receiving, by the first computing device, an access request from the user to access the particular Wi-Fi network from the list of Wi-Fi networks on the first computing device, the particular Wi-Fi network being an access restricted Wi-Fi network;

determining, by the first computing device and in response to the receiving the access request, whether any of the computing devices can approve the access request, the determining including:

sending an approval request to a set of the computing devices that are in proximity to the first computing device for approving the access request, the sending the approval request using a short range wireless communication;

responsive to a determination that a second computing device of the set of computing devices can approve the access request, obtaining an approval from the second computing device for accessing the particular Wi-Fi network on the first computing device, the obtaining including:

presenting, by the second computing device, a notification on the second computing device requesting the user to approve the access request, and obtaining, upon approval of the access request by the user, the authentication profile containing authentication information for accessing the particular Wi-Fi network from the second computing device, the obtaining using the short range wireless communication, the obtaining including requesting, by the second computing device, a server computer to verify whether the first computing device is a member of a trusted devices group of which the second computing device is a member; and accessing, by the first computing device, the particular Wi-Fi network using the authentication profile obtained from the second computing device.

2. The computer-implemented method of claim 1, wherein obtaining the approval from the second computing device facilitates the user to access the particular Wi-Fi network without having the user to input the authentication information manually on the first computing device.

3. The computer-implemented method of claim 1, wherein the approval from the second computing device is restricted to a group of computing devices that are members of the trusted devices group of which the second computing device is a member.

4. The computer-implemented method of claim 1, wherein accessing the particular Wi-Fi network from the first computing device using the authentication profiles includes:

extracting, by the first computing device, the authentication information from the authentication profile, providing, by the first computing device, the authentication information to the particular Wi-Fi network, and receiving, by the first computing device, access to the particular Wi-Fi network.

5. The computer-implemented method of claim 1, wherein the trusted devices group includes a plurality of unique identifications (IDs) associated with corresponding computing devices of the group.

6. The computer-implemented method of claim 5, wherein each of the unique IDs can be any of a user ID of the user, a device ID of the corresponding computing device, or a user-defined ID.

7. The computer-implemented method of claim 1, wherein the trusted devices group is stored in each of the computing devices of the user.

8. The computer-implemented method of claim 1, wherein the trusted devices group is stored in the server computer accessible by the computing devices.

9. The computer-implemented method of claim 1, wherein determining whether the second computing device is in proximity to the first computing device includes determining whether the first computing device and the second computing device can communicate with each other using the short range wireless communication.

10. The computer-implemented method of claim 1, wherein the short range wireless communication includes communicating via at least one of (a) Bluetooth, (b) WiFi direct, (c) WiFi, (d) near field communication (NFC), (e) AirDrop, (f) Infrared, or (g) digital living network alliance (DLNA).

11. The computer-implemented method of claim 1, wherein the authentication profile for the particular Wi-Fi network stored at the second computing device is generated by the second computing device and upon successful authentication of the user on the second computing device by the particular Wi-Fi network.

12. The computer-implemented method of claim 1, wherein the second computing devices obtains access to the particular Wi-Fi network upon successful authentication of the user on the second computing device, the obtaining includes:

obtaining, at the second computing device, the list of Wi-Fi networks that are in range of the second computing device;

requesting, by the second computing device, the particular Wi-Fi network from the list of Wi-Fi networks for an access to the particular Wi-Fi network;

receiving, at the second computing device, an authentication prompt from the particular Wi-Fi network requesting the user to provide the authentication information for gaining access to the particular Wi-Fi network;

manually inputting, by the user, the authentication information at the second computing device; and obtaining access to the particular Wi-Fi network on the second computing device upon successful authentication of the user based on the authentication information.

13. The computer-implemented method of claim 1, wherein the authentication information includes at least one of a user name, a password, a passcode, a personal identification number (PIN), or an answer to a challenge question posted by the Wi-Fi network.

14. The computer-implemented method of claim 1, wherein obtaining the authentication profile from the second computing device includes:

encrypting, by the second computing device, the authentication profile to generate an encrypted authentication profile, and transmitting the encrypted authentication profile to the first computing device.

15. A computer-implemented method for sharing an authentication profile between a plurality of computing devices, using a server, for accessing a particular Wi-Fi network, the method comprising:

obtaining, at a first computing device of the computing devices, a list of Wi-Fi networks that are in range of the first computing device, the computing devices associated with one or more users, the first computing device associated with a first user of the one or more users;

receiving, by the first computing device, an access request from the first user to access the particular Wi-Fi network from the list of Wi-Fi networks on the first computing device, the particular Wi-Fi network being an access restricted Wi-Fi network;

sending, by the first computing device and in response to receiving the access request, an approval request to the server, the server facilitating obtaining access to the particular Wi-Fi network to approve the access request;

causing the server to determine whether the server can approve the access request, the determining including:
    causing the server to determine whether any of a remaining set of the computing devices have the authentication profile, the authentication profile containing authentication information for accessing the particular Wi-Fi network, and
    causing the server to receive a response from a second computing device of the remaining set of the computing devices indicating that the second computing device contains the authentication profile;

responsive to a determination that the server can approve the access request, obtaining an approval from the server for accessing the particular Wi-Fi network on the first computing device, the obtaining including:
    causing, by the second computing device, the server to determine whether the first computing device is a member of a trusted devices group of which the second computing device is a member, wherein the sharing of the authentication profile is restricted to a group of the computing devices that are members of the trusted devices group, and
    responsive to a determination that the first computing device is a member of the trusted devices group, causing the server to obtain the authentication profile from the second computing device; and accessing, by the first computing device, the particular Wi-Fi network using the authentication profile obtained from the server.

16. The computer-implemented method of claim 15, wherein obtaining the approval from the server facilitates the first user to access the particular Wi-Fi network on the first computing device without having to input the authentication information on the first computing device manually.

17. The computer-implemented method of claim 15 further comprising:
    responsive to a determination that the server cannot approve the access request, presenting a notification on a display of the second computing device using which a user of the one or more user associated with the second computing device manually approves the access request.

18. The computer-implemented method of claim 15, wherein accessing the particular Wi-Fi network from the first computing device using the authentication profiles includes:
    extracting, by the first computing device, the authentication information from the authentication profile,
    providing, by the first computing device, the authentication information to the particular Wi-Fi network, and
    receiving, by the first computing device, access to the particular Wi-Fi network.

19. The computer-implemented method of claim 15, wherein obtaining the authentication profile from the second computing device includes:
    encrypting, by the second computing device, the authentication profile to generate an encrypted authentication profile, and
    transmitting the encrypted authentication profile to the first computing device.

20. A computing device for obtaining access to a particular Wi-Fi network, comprising:
    a processor;
    an access request engine that works in co-operation with the processor to
        obtain a list of Wi-Fi networks that are in a range of the computing device, the computing device associated with a first user, and
        receive an access request from the first user to access the particular Wi-Fi network from the list of Wi-Fi networks on the computing device, the particular Wi-Fi network being an access restricted Wi-Fi network;
    an authentication profile discovery engine to
        determine, in response to the receiving the access request, whether any of a plurality of computing devices that are in proximity to the computing device can approve the access request, the computing devices associated with one or more users, the determining including:
            sending an approval request to the computing devices for approving the access request, the sending the approval request using a short range wireless communication, and
            receiving a response from a second computing device of the computing devices indicating that the second computing device can approve the access request, the second computing device associated with a second user of the one or more users;
        responsive to a determination that the second computing device can approve the access request, obtain an approval from the second computing device for accessing the particular Wi-Fi network on the computing device, the obtaining including:
            causing the second computing device to display a notification on the second computing device requesting the second user to approve the access request, the causing including obtaining, by the second computing device, a verification that the first computing device is a member of a trusted devices group of which the second computing device is a member, and
            obtaining, upon approval of the access request by the second user, an authentication profile containing authentication information for accessing the particular Wi-Fi network from the second computing device, the obtaining using the short range wireless communication; and
    an authentication engine to provide the computing device access to the particular Wi-Fi network using the authentication profile obtained from the second computing device.

21. The computing device of claim 20 further comprising:
    an decryption engine to decrypt the authentication profile received from the second computing device; and
    an encryption engine to encrypt a first authentication profile generated by the computing device, the first authentication profile containing authentication information manually input by the first user at the computing device to gain access to the particular Wi-Fi network.

22. The computing device of claim 20, wherein the short range wireless communication includes at least one of (a) Bluetooth, (b) WiFi direct, (c) WiFi, (d) NFC, (e) AirDrop, (f) Infrared, or (g) DLNA.

23. A server for facilitating sharing of an authentication profile between multiple computing devices to access a particular Wi-Fi network, comprising:
    a processor;
    a profile sharing request engine that works in cooperation with the processor to receive a request from a first computing device to approve an access request for accessing the particular Wi-Fi network, the first computing device associated with a first user;

an authentication profile discovery engine to determine whether any of a plurality of computing devices have an authentication profile of the particular Wi-Fi network, the authentication profile containing authentication information for accessing the particular Wi-Fi network, the computing devices associated with one or more users, and receive a response from a second computing device of the computing devices indicating that the second computing device contains the authentication profile, determine whether the first computing device is a member of a trusted devices group of which the second computing device is a member, wherein the sharing of the authentication profile is restricted to a group of the computing devices that are members of the trusted devices group, responsive to a determination that the first computing device is a member of the trusted devices group, obtain the authentication profile from the second computing device; and a network engine to provide the authentication profile obtained from the second computing device to the first computing device.

24. The server of claim 23 further comprising:

a storage device to store the authentication profile received from the second computing device.

* * * * *